(12) United States Patent
Gandhi et al.

(10) Patent No.: US 7,674,743 B2
(45) Date of Patent: Mar. 9, 2010

(54) CATALYST SYSTEM FOR THE REDUCTION OF NOX AND $NH_3$ EMISSIONS

(75) Inventors: Haren Sakarai Gandhi, West Bloomfield, MI (US); John Vito Cavataio, Dearborn, MI (US); Robert Henry Hammerle, Franklin, MI (US); Yisun Cheng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/325,787

(22) Filed: Dec. 1, 2008

(65) Prior Publication Data

US 2009/0149318 A1    Jun. 11, 2009

Related U.S. Application Data

(60) Continuation of application No. 11/684,064, filed on Mar. 9, 2007, now Pat. No. 7,485,273, which is a division of application No. 10/065,470, filed on Oct. 22, 2002, now Pat. No. 7,332,135.

(51) Int. Cl.
| | |
|---|---|
| *B01D 53/56* | (2006.01) |
| *B01D 53/94* | (2006.01) |
| *B01J 23/10* | (2006.01) |
| *B01J 23/38* | (2006.01) |
| *B01J 23/745* | (2006.01) |

(52) U.S. Cl. .................. 502/302; 502/304; 502/325; 502/340; 502/344; 502/349; 502/527.12; 502/527.13; 423/213.2; 423/213.5; 423/213.7; 423/239.1; 423/239.2

(58) Field of Classification Search .......... 502/527.12, 502/527.13, 304, 325, 349, 302, 344, 340; 423/213.2, 213.5, 213.7, 239.1, 239.2

See application file for complete search history.

(56) References Cited

U.S. PATENT DOCUMENTS

| | | | |
|---|---|---|---|
| 3,767,764 | A | 10/1973 | Dolbear |
| 5,041,270 | A | 8/1991 | Fujitani et al. |
| 5,461,857 | A | 10/1995 | Itou et al. |
| 5,471,836 | A | 12/1995 | Takeshima et al. |
| 5,473,887 | A | 12/1995 | Takeshima et al. |
| 5,499,501 | A | 3/1996 | Kato et al. |
| 5,551,231 | A | 9/1996 | Tanaka et al. |
| 5,782,087 | A | 7/1998 | Kinugasa et al. |

(Continued)

FOREIGN PATENT DOCUMENTS

DE        019949046 A1    5/2001

(Continued)

*Primary Examiner*—Timothy C Vanoy
(74) *Attorney, Agent, or Firm*—Rothwell, Figg, Ernst & Manbeck P.C.

(57) ABSTRACT

This catalyst system simultaneously removes ammonia and enhances net NOx conversion by placing an $NH_3$—SCR catalyst formulation downstream of a lean NOx trap. By doing so, the $NH_3$—SCR catalyst adsorbs the ammonia from the upstream lean NOx trap generated during the rich pulses. The stored ammonia then reacts with the NOx emitted from the upstream lean NOx trap-enhancing the net NOx conversion rate significantly, while depleting the stored ammonia. By combining the lean NOx trap with the $NH_3$—SCR catalyst, the system allows for the reduction or elimination of $NH_3$ and NOx slip, reduction in NOx spikes and thus an improved net NOx conversion during lean and rich operation.

9 Claims, 7 Drawing Sheets

U.S. PATENT DOCUMENTS

| | | | |
|---|---|---|---|
| 5,964,088 A | 10/1999 | Kinugasa et al. | |
| 5,974,793 A | 11/1999 | Kinugasa et al. | |
| 6,047,542 A | 4/2000 | Kinugasa et al. | |
| 6,052,989 A | 4/2000 | McCabe et al. | |
| 6,069,013 A | 5/2000 | Plog et al. | |
| 6,109,024 A | 8/2000 | Kinugasa et al. | |
| 6,119,452 A | 9/2000 | Kinugasa et al. | |
| 6,133,185 A | 10/2000 | Kinugasa et al. | |
| 6,176,079 B1 | 1/2001 | Konrad et al. | |
| 6,221,804 B1 | 4/2001 | Yamada et al. | |
| 6,230,485 B1 | 5/2001 | Kisenyi | |
| 6,276,132 B1 | 8/2001 | Kanesaka et al. | |
| 6,301,878 B1 | 10/2001 | Zhang et al. | |
| 6,345,496 B1 | 2/2002 | Fuwa et al. | |
| 6,672,051 B2 | 1/2004 | Tamura et al. | |
| 6,677,264 B1 * | 1/2004 | Klein et al. | 502/74 |
| 6,753,294 B1 | 6/2004 | Brisley et al. | |
| 6,766,642 B2 | 7/2004 | Binder et al. | |
| 6,820,415 B2 | 11/2004 | Abet et al. | |
| 6,825,145 B2 * | 11/2004 | Tanada et al. | 502/64 |
| 6,826,996 B2 | 12/2004 | Strait | |
| 6,953,769 B2 * | 10/2005 | Yamada et al. | 502/302 |
| 7,052,532 B1 | 5/2006 | Liu et al. | |
| 7,062,904 B1 | 6/2006 | Hu et al. | |
| 7,211,226 B2 | 5/2007 | Liu et al. | |
| 7,214,331 B2 * | 5/2007 | Jiang et al. | 252/373 |
| 7,225,613 B2 | 6/2007 | Hammerle et al. | |
| 2001/0006934 A1 * | 7/2001 | Kachi et al. | 502/325 |
| 2005/0129601 A1 | 6/2005 | Li et al. | |
| 2006/0140833 A1 | 6/2006 | Morita et al. | |
| 2008/0026932 A1 * | 1/2008 | Satoh et al. | 502/73 |
| 2008/0159936 A1 | 7/2008 | Zones et al. | |

FOREIGN PATENT DOCUMENTS

| | | |
|---|---|---|
| EP | 0773354 A1 | 5/1997 |
| EP | 0878609 A2 | 11/1998 |
| EP | 1027919 A2 | 8/2000 |
| EP | 1213460 A2 | 6/2008 |
| JP | 11030117 A | 2/1999 |
| JP | 2001-140630 A | 5/2001 |
| JP | 2002-153755 A | 5/2002 |
| JP | 2002-242667 A | 8/2002 |

* cited by examiner

T = 250C
L = 50s, 5s rich

Fig. 5b

T = 250C
L = 50s, 5s rich

T = 200C
L = 25s, 5s rich

Fig. 9

CATALYST SYSTEM FOR THE REDUCTION OF NOX AND NH$_3$ EMISSIONS

CROSS-REFERENCE TO RELATED APPLICATIONS

This application is a continuation of U.S. application Ser. No. 11/684,064, filed Mar. 9, 2007 now U.S. Pat. No. 7,485,273, which is a continuation of U.S. application Ser. No. 10/065,470, filed Oct. 22, 2002, now U.S. Pat. No. 7,332,135.

BACKGROUND OF THE INVENTION

1. Field of the Invention

The present invention is directed to a catalyst system to facilitate the reduction of nitrogen oxides (NOx) and ammonia from an exhaust gas. More particularly, the catalyst system of this invention includes a lean NOx trap in combination with an ammonia selective catalytic reduction (NH$_3$—SCR) catalyst, which stores the ammonia formed in the lean NOx trap during rich air/fuel operation and then reacts the stored ammonia with nitrogen oxides to improve NOx conversion to nitrogen when the engine is operated under lean air/fuel ratios. In an alternate embodiment, a three-way catalyst is designed to produce desirable NH$_3$ emissions at stoichiometric conditions and thus reduce NOx and NH$_3$ emissions.

2. Background Art

Catalysts have long been used in the exhaust systems of automotive vehicles to convert carbon monoxide, hydrocarbons, and nitrogen oxides (NOx) produced during engine operation into non-polluting gases such as carbon dioxide, water and nitrogen. As a result of increasingly stringent fuel economy and emissions standards for car and truck applications, it is preferable to operate an engine under lean conditions to improve vehicle fuel efficiency and lower CO$_2$ emissions. Lean conditions have air/fuel ratios greater than the stoichiometric ratio (an air/fuel ratio of 4.6), typically air/fuel ratios greater than 15. While lean operation improves fuel economy, operating under lean conditions increases the difficulty in treating some polluting gases, especially NOx.

Regarding NOx reduction for diesel and lean burn gasoline engines in particular, lean NOx adsorber (trap) technologies have been widely used to reduce exhaust gas NOx emissions. Lean NOx adsorbers operate in a cyclic fashion of lean and rich durations. The lean NOx trap functions by adsorbing NOx when the engine is running under lean conditions-until the NOx trap reaches the effective storage limit-followed by NOx reduction when the engine is running under rich conditions. Alternatively, NOx reduction can proceed by simply injecting into the exhaust a sufficient amount of reductant that is independent of the engine operation. During this rich cycle, a short rich pulse of reductants, carbon monoxide, hydrogen and hydrocarbons reduces the NOx adsorbed by the trap during the lean cycle. The reduction caused during the rich cycle purges the lean NOx adsorber, and the lean NOx adsorber is then immediately available for the next lean NOx storage/rich NOx reduction cycle. In general, poor NOx reduction is observed if the air excess ratio λ is above 1. NOx reduction generally increases over lean NOx adsorbers as the λ ratio is decreased lower than 1. This air excess or lambda ratio is defined as the actual air/fuel ratio divided by the stoichiometric air/fuel ratio of the fuel used. The use of lean NOx adsorber (trap) technology, and in particular the rich pulse of reductants, can cause the λ ratio to reach well below 1.

Figure 1A:
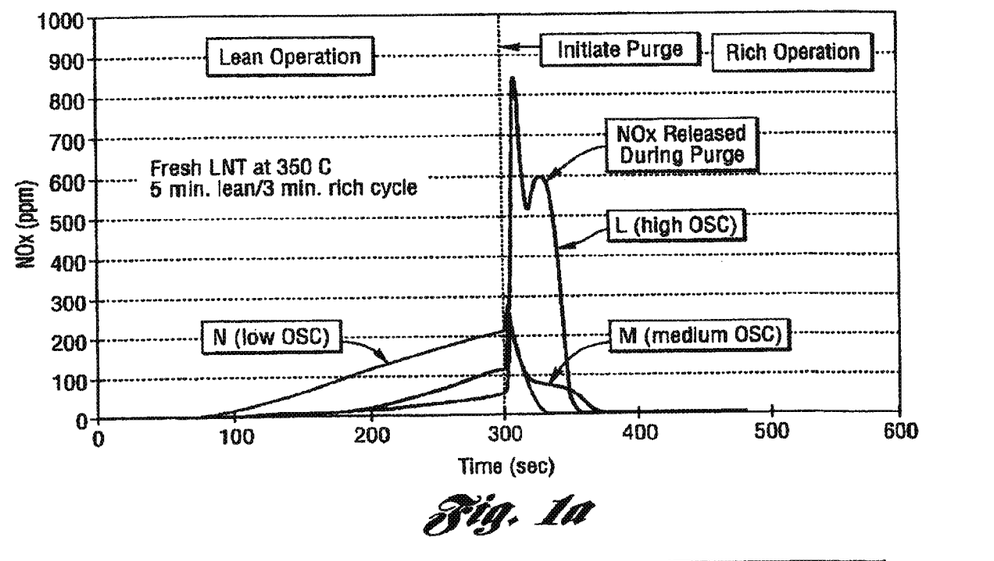
FIG. 1a is a graph illustrating the NOx spikes that occur during the NOx trap lean-rich transition.

Lean NOx traps, however, often have the problem of low NOx conversion; that is, a high percentage of the NOx slips through the trap as NOx. NOx slip can occur either during the lean portion of the cycle or during the rich portion. The lean NOx slip is often called "VNOx breakthrough." It occurs during extended lean operation and is related to saturation of the NOx trap capacity. The rich NOx slip is often called a "NOx spike." It occurs during the short period in which the NOx trap transitions from lean to rich and is related to the release of stored NOx without reduction. Test results depicted in FIG. 1$a$ have shown that during this lean-rich transition, NOx spikes, the large peaks of unreacted NOx accounts for approximately 73% of the total NOx emitted during the operation of a lean NOx trap. NOx breakthrough accounts for the remaining 27% of the NOx emitted.

Figure 1B:
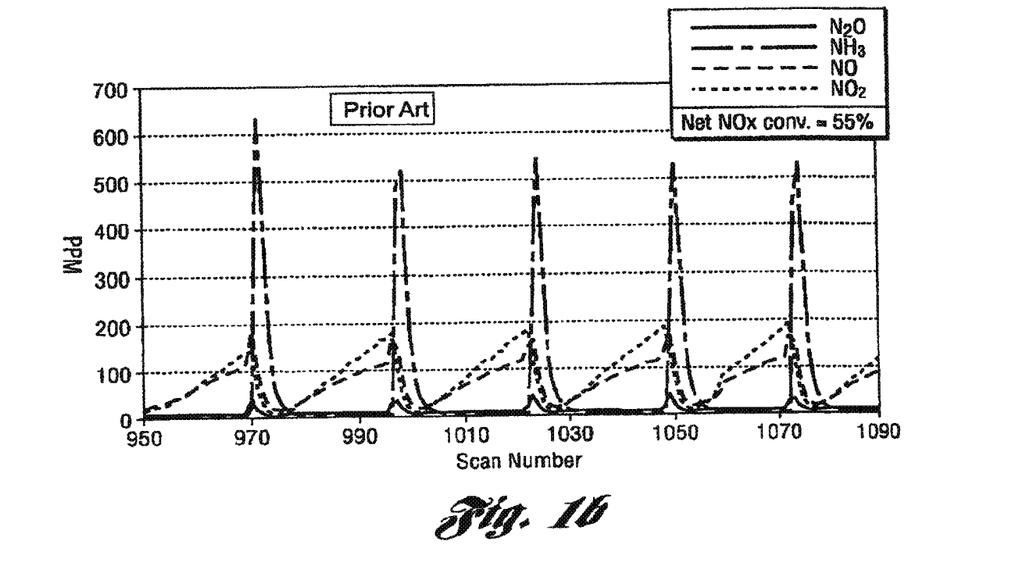
FIG. 1b is a graph illustrating NOx and $NH_3$ emissions from a typical prior art lean $NO_x$ adsorber system.

An additional problem with lean NOx traps arises as a result of the generation of ammonia by the lean NOx trap. As depicted in FIG. 1$b$, ammonia is emitted into the atmosphere during rich pulses of the lean NOx adsorber. In laboratory reactor experiments, ammonia spikes as high as 600 ppm have been observed under typical lean NOx adsorber operation (see FIG. 1$b$). While ammonia is currently not regulated, ammonia emissions are being closely monitored by the U.S. Environmental Protection Agency; and, therefore, reduction efforts must be underway. Ammonia is created when hydrogen or hydrogen bound to hydrocarbons reacts with NOx over a precious metal, such as platinum. The potential for ammonia generation increases for a precious metal catalyst (such as a lean NOx trap) as the λ ratio is decreased, as the duration of the rich pulse increases, and the temperature is decreased. There is thus an optimum λ and rich pulse duration where the maximum NOx reduction is observed without producing ammonia. Attempts to enhance conversion of NOx by decreasing the λ ratio of the rich pulse duration leads to significant production of ammonia and thus results in high gross NOx conversion (NOx→N$_2$→NH$_3$), but much lower net NOx conversion (NOx→N$_2$).

In addition to nitrogen, a desirable non-polluting gas, and the undesirable NH$_3$ described above, N$_2$O is another NOx reduction products. Like NH$_3$, N$_2$O is generated over NOx adsorbers and emitted into the atmosphere during rich pulses. The gross NOx conversion is the percent of NOx that is reduced to N$_2$, N$_2$O and N$_3$. The net NOx conversion is the percent of NOx that is reduced to nitrogen, N$_2$, only. Accordingly, the gross NOx conversion is equal to the net NOx conversion if nitrogen is the only reaction product. However, the net NOx conversion is almost always lower than the gross NOx conversion. Accordingly, a high gross NOx conversion does not completely correlate with the high portion of NOx that is reduced to nitrogen.

The NOx conversion problem is magnified for diesel vehicles, which require more than a 90% NOx conversion rate under the 2007 U.S. Tier II BIN 5 emissions standards at temperatures as low as 200° C. While high NOx activity is possible at 200° C., it requires extreme measures such as shortening the lean time, lengthening the rich purge time, and invoking very rich air/fuel ratios. All three of these measures, however, result in the increased formation of NOx or ammonia. Accordingly, while it may be possible to achieve 90+% gross NOx conversion at 200° C., to date there has not been a viable solution to achieve 90+% net NOx conversion.

Accordingly, a need exists for a catalyst system that eliminates NOx breakthrough during the lean operation as well has the NOx spikes during the lean-rich transition period. There is also a need for a catalyst system that is capable of improving net NOx conversion. Finally, there is a need for a catalyst system capable of reducing ammonia emissions.

SUMMARY OF THE INVENTION

Figure 2:
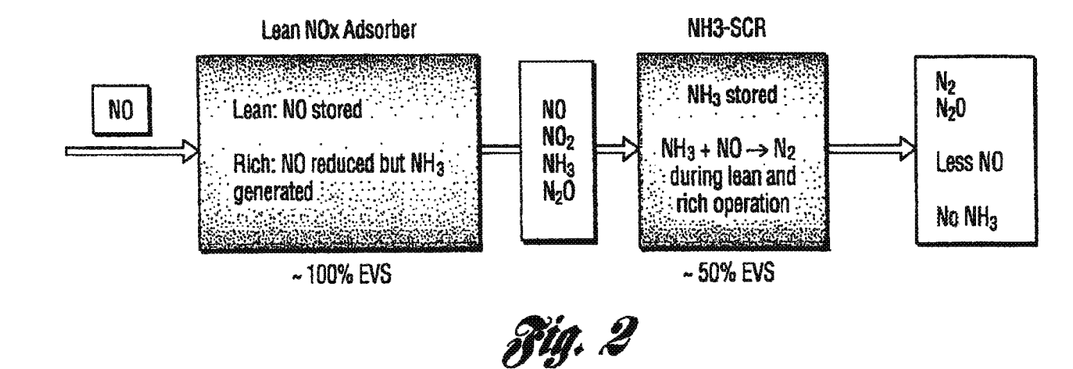
FIG. 2 depicts the lean NOx and $NH_3$—SCR catalyst system of the present invention.
Figure 3:
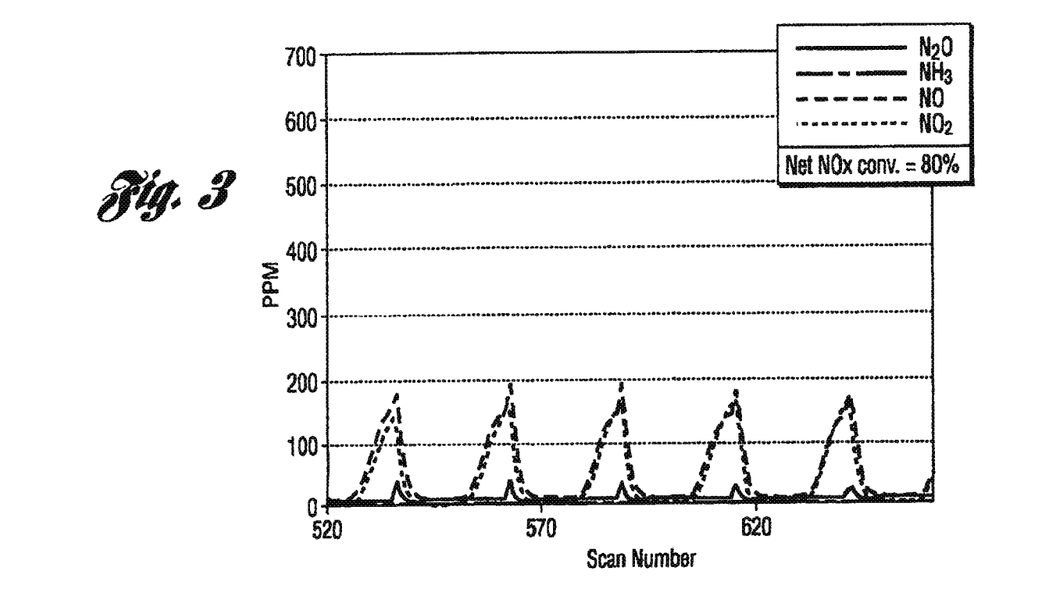
FIG. 3 depicts reduced NOx emissions and $NH_3$ emissions as a result of the use of the lean NOx and $NH_3$—SCR catalyst system of the present invention, as shown in FIG. 2.

This invention provides a solution for all of the above problems and, in particular, reduces or eliminates ammonia emissions and improves the net NOx conversion of the catalyst system. These problems are solved by simultaneously removing ammonia and enhancing NOx conversion with the use of an $NH_3$—SCR catalyst placed downstream of the lean NOx adsorber catalyst, as shown in FIG. 2. The $NH_3$—SCR catalyst system serves to adsorb the ammonia emissions from the upstream lean NOx adsorber catalyst generated during the rich pulses. Accordingly, as shown in FIG. 2, the ammonia emissions produced by the lean NOx adsorber is stored and effectively controlled by the $NH_3$—SCR catalyst rather than being emitted. This reservoir of adsorbed ammonia then reacts directly with the NOx emitted from the upstream lean NOx adsorber. As a result, as shown in FIG. 3, the overall net conversion is enhanced from 55% to 80%, while depleting the stored ammonia, as a function of the SCR reaction: $NH_3$+ NOx→$N_2$. The $NH_3$—SCR catalyst is then replenished with ammonia by subsequent rich pulses over the lean NOx adsorber.

During the lean cycle for this lean NOx adsorber+$NH_3$—SCR system, the NOx breakthrough from the upstream lean NOx adsorber is reduced continuously as it passes over the $NH_3$—SCR until the reservoir of ammonia is depleted. In addition, during the rich cycle, large spikes of unreacted NOx, are created. The downstream $NH_3$—SCR catalyst thus serves to dampen these large NOx, spikes by reacting the unreacted NOx, with the reservoir of stored ammonia emitted from the lean NOx adsorber. In general, the combination of the lean NOx, adsorber+$NH_3$—SCR catalyst system allows for the reduction, or elimination, of ammonia emissions and NOx slip, i.e., reduction of NOx breakthrough and NOx spikes and, therefore, improved net NOx conversion during lean and rich operation.

Additionally, under this invention, urea and/or ammonia does not need to be injected into the exhaust system to effectuate the reaction between NOx and ammonia. Rather, the ammonia is automatically generated from the NOx present in the exhaust gas as it passes over the precious metal lean NOx adsorber during the rich pulses. The generated ammonia is then stored on the downstream $NH_3$—SCR catalyst to react with the unreacted NOx and thereby convert the unreacted NOx to nitrogen.

The $NH_3$—SCR catalyst thus serves to adsorb the ammonia from the upstream lean NOx adsorber catalyst generated during the rich pulses. Under this system, the ammonia is stored and effectively controlled rather than being emitted. This reservoir of adsorbed ammonia then reacts directly with any NOx emitted from the upstream lean NOx adsorber. As a result, the overall net NOx conversion is enhanced from 55% to 80%, while the overall gross NOx conversion is enhanced from 68% to 82%, as shown in FIG. 3.

Figure 4A:
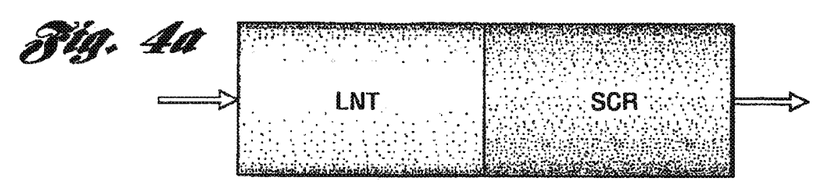
FIGS. 4a, 4b, and 4c depict three different zoned catalyst embodiments of the lean NOx and $NH_3$—SCR catalyst system.
Figure 4B:
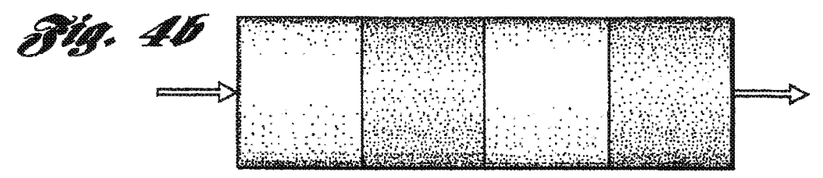
Figure 4C:
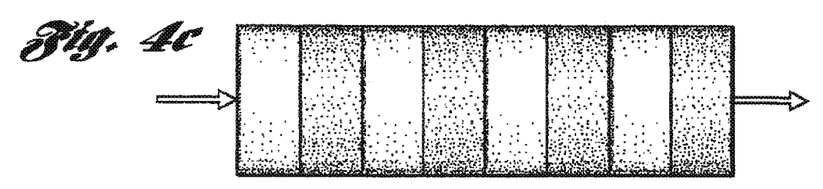

In one alternative embodiment of this invention, the catalyst system can be optimized and NOx reduction increased by vertically slicing the lean NOx trap and $NH_3$—SCR catalyst substrates to create separate catalyst zones, such that the catalytic converter shell or can would have alternating sections of lean NOx trap and $NH_3$—SCR catalysts, as shown in FIGS. 4a, 4b and 4c. Under this embodiment, both technologies, the lean NOx trap formulation and the $NH_3$—SCR formulation, can be incorporated into a single substrate and/or a single converter can rather than placing the $NH_3$—SCR catalyst downstream of the lean NOx adsorber as two separate and distinct catalyst substrates.

DETAILED DESCRIPTION OF THE PREFERRED EMBODIMENTS

In this invention, net NOx conversion is improved and ammonia emissions reduced through the use of a lean NOx trap and $NH_3$—SCR catalyst system which operate together to produce and store ammonia and reduce NOx to nitrogen. In so doing, the catalyst system of the present invention solves three problems of lean NOx traps; namely, reducing NOx breakthrough, NOx spikes and ammonia emissions.

In order to meet increasingly stringent fuel economy standards, it is preferable to operate an automotive engine under lean conditions. However, while there is improvement in fuel economy, operating under lean conditions has increased the difficulty in reducing NOx emissions. As an example, for a traditional three-way catalyst, if the air/fuel ratio is lean even by a small amount, NOx conversion drops to low levels. With traditional three-way catalysts, the air/fuel ratio must be controlled carefully at stoichiometric conditions to maximize reduction of hydrocarbons, carbon monoxide and NOx.

Throughout this specification, NOx refers to nitrogen oxides, which include nitrogen monoxide NO and nitrogen dioxide $NO_2$. Further, lean NOx adsorber and lean NOx trap are used interchangeably throughout this specification.

To achieve NOx reduction, under lean operating conditions, one option is the inclusion of a lean NOx trap. While the lean NOx trap is generally effective in NOx reduction, lean NOx traps are known to have the problems referred to as "NOx slip" which includes breakthrough of NOx during the extended lean operation of the NOx trap and also NOx spikes generated during the transition from the lean to the rich cycle.

NOx spikes, or NOx emissions during the lean-rich transition, are believed to occur due to the exothermic heat generated from the oxidation of reductants, carbon monoxide, hydrocarbons and hydrogen, by the oxygen released from the oxygen storage material—the temperature rise can be as high as 80-100° C.

The problem of NOx spikes is illustrated in FIG. 1a, and the problem of insufficient net NOx conversion is illustrated in FIG. 1b. FIG. 1b depicts laboratory reactor data of a lean NOx adsorber system operating in an 85 second lean and 5 second rich cyclic pattern. The plot in FIG. 1b shows the nitrogen species concentration as a function of time. The laboratory reactor data depicted in FIG. 1b resulted from a catalyst having an engine swept volume (ESV) of 100%. Additionally, the reactor used to obtain the results in FIG. 1b was at a temperature of 300° C. To begin the cycle, 500 ppm of nitrogen oxide was fed into the reactor where much of it was stored during the 85 second lean duration. During the 5 second rich duration, nitrogen oxide was reduced; however, a significant amount of ammonia was formed. As illustrated in FIG. 1b, the data shows ammonia spikes as high as 600 ppm under typical lean NOx adsorber operation. Conversion, however, is generally improved as the λ ratio is decreased during the rich pulse. Decreasing the λ ratio also leads to significant production of ammonia and thus results in high gross NOx conversion ($NO_x \rightarrow N_2 + NH_3$), but much lower net NOx conversion ($NOx \rightarrow N_2$). As illustrated in FIG. 1b, the net NOx conversion to nitrogen for this lean NOx adsorber system was only 55%.

Under the catalyst system of this invention, ammonia is reduced and the net NOx conversion improved simultaneously by placing an $NH_3$—SCR catalyst formulation downstream of the lean NOx adsorber catalyst, as shown in FIG. 2.

FIG. 2 is an illustration of the catalyst system of this invention, which is capable of simultaneously eliminating ammonia emissions and improving net NOx conversion. As illustrated in FIG. 2, NOx produced during engine operation is stored by the lean NOx adsorber during the lean cycle. Following the lean cycle, during the rich cycle of the lean NOx adsorber NOx is reduced and ammonia generated. The lean NOx adsorber stores much of the NOx during the lean operation and then reduces NOx during rich pulses of the reductants. During the same rich pulses, significant amounts of ammonia are generated, as further illustrated in FIG. 1. As illustrated in FIG. 2, the lean NOx adsorber emits NO, $NO_2$, $NH_3$, and $N_2O$. These same gases then pass through the $NH_3$—SCR, where $NH_3$ is stored. Accordingly, the addition of the $NH_3$—SCR catalyst downstream allows for the adsorption of $NH_3$ and subsequent reaction with any NOx that slips through the upstream lean NOx adsorber, which thus improves the overall net NOx conversion ($NH_3 + NO \rightarrow N_2$). As can be seen in FIG. 2, the catalyst system of this invention results in a significant net NOx conversion improvement, the elimination of ammonia emissions, and the production of non-polluting gases nitrogen and $N_2O$.

It should be noted that for diesel applications, lean NO, NOx adsorbers must operate at lower temperatures compared to gasoline lean NOx adsorbers since the exhaust temperatures of diesel engines are significantly lower. More ammonia is generated at 200° C. than at 300° C. over lean NOx adsorbers and thus the catalyst system of this invention has an even greater potential for diesel applications. Likewise, the problem of NOx spikes is more critical at higher temperatures, the temperatures used for gasoline applications; and thus the catalyst system of this invention is beneficial to control the unreacted NOx spikes that result from the operation of a lean NOx adsorber at operating temperatures typical for gasoline lean NOx adsorber applications.

The $NH_3$—SCR catalyst thus serves to adsorb the ammonia produced naturally from the upstream lean NOx adsorber catalyst generated during the rich pulses. As a result, the $NH_3$—SCR catalyst stores the ammonia, controlling it rather than allowing it to be emitted into the atmosphere. This reservoir of adsorbed $NH_3$ in the $NH_3$—SCR catalyst reacts directly with the NOx emitted from the upstream lean NOx adsorber (trap).

In general, this invention works to clean NOx emissions—and thus has applicability for stationary sources as well as for moving vehicles. This invention may be used to reduce NOx emissions for nitric acid plants, or any other stationary source that requires the reduction of NOx emissions. This invention is nonetheless particularly directed for use with gasoline and diesel vehicles which, unlike stationary sources, have a wide range of operating parameters, especially temperature parameters-which cannot be precisely controlled. The present invention has the ability to store large quantities of ammonia across a broad temperature range to effectuate the reaction between ammonia and nitrogen oxides and thereby convert NOx to nitrogen.

As illustrated in FIG. 3, laboratory experiments have demonstrated that the use of a lean NOx adsorber plus $NH_3$—SCR catalyst system improves net NOx conversion from 55%, as illustrated in FIG. 1, to 80%. FIG. 3 is a graph displaying laboratory data obtained using the catalyst system of this invention, wherein NOx ppm are charted as a function of time. As illustrated in FIG. 3, the catalyst system of this invention completely eliminated the ammonia spikes created during the rich pulses of the lean NOx adsorber. In this system, ammonia is stored on the $NH_3$—SCR catalyst where it reacts with NOx during the 85 second lean duration, which thus improves the net NOx conversion from 55% to 80% with no additional fuel economy penalty. As shown in FIG. 3, the improved net NOx conversion can be observed by the much narrower profile-zero ppm NOx is emitted for a significant amount of time as compared to the graph shown in FIG. 1 of a system lacking the $NH_3$—SCR+lean NOx adsorber combination.

The reaction between the stored ammonia and NOx increases the overall net NOx conversion, which is enhanced from 55%—the amount of NOx converted in prior art lean NOx trap systems—to 80%—as a result of the combination of a lean NOx trap and $NH_3$—SCR catalyst system. Moreover, in addition to improving net NOx conversion, the ammonia stored in the $NH_3$—SCR catalyst is depleted during the SCR reaction wherein ammonia and nitrogen oxide are reacted to produce nitrogen. The $NH_3$—SCR catalyst is replenished with ammonia by subsequent rich pulses over the lean NOx adsorber that causes a portion of the NOx to react with hydrogen to form ammonia.

It should be noted that no urea or ammonia needs to be injected into the exhaust system to effectuate the reaction between ammonia and NOx. Rather, the ammonia is naturally generated from the NOx present in the exhaust gas as it passes over the lean NOx trap during rich pulses. More specifically, ammonia is naturally created during the fuel rich cycle of the lean NOx trap. Ammonia is naturally produced as it passes over the precious metal active component of the lean NOx trap. Similarly, the ammonia could also be generated in a conventional precious metal based TWC located upstream of a LNT/$NH_3$—SCR system.

For this invention, the lean NOx trap is optimized for ammonia generation by removing oxygen storage capacity (OSC) and thereby enhancing the rich cycle and thus creating a greater quantity of ammonia for reaction with the NOx in the downstream NH₃—SCR catalyst. In a preferred embodiment, the lean NOx trap includes platinum as the precious metal. Platinum is the preferred precious metal because it is believed that a greater quantity of $NH_3$ is produced over platinum than rhodium, palladium and/or a combination of the precious metals. Nonetheless, other precious metals such as palladium and rhodium, and the combination of one or more of the precious metals platinum, palladium and rhodium may also be used to generate $NH_3$.

Additionally, the lean NOx trap of this invention preferably includes a "NOx adsorbing material" or NOx storage component/material, which can be alkali and alkali alkali earth metals such as barium, cesium, and/or rare earth metals such as cerium and/or a composite of cerium and zirconium. Although an alternative catalyst formulation that does not contain a NOx storage component but generates ammonia from NOx, may also be utilized, in the most preferred embodiment, the NOx storage material should have the ability to store NOx at low temperature ranges, specifically in the range of 150° C.-300° C. The $NH_3$ thermodynamic equilibrium under rich conditions is maximized during the temperature range of 150° C.-300° C.

In general, to increase the NOx storage function of the lean NOx trap and effectuate the NOx conversion reaction, in the preferred embodiment, the lean NOx trap has the following characteristics: (1) the inclusion of platinum as the precious metal; (2) the ability to store NOx between 150° C. and 500° C. during the lean portion of the cycle; (3) the ability to maximize the duration of the lean NOx trap rich cycle; (4) the ability to generate ammonia at the 150° C.-500° C. temperature range; (5) minimize OSC to lessen fuel penalty; and (6) lower λ to generate more ammonia. Ammonia production is maximized at the preferred temperature range, 150° C.-300° C.—which also correlates with the steady state equilibrium range for ammonia creation. It bears emphasis that other NOx storage components may be utilized, especially for stationary sources, where sulfur poisoning does not pose a threat.

Most simply, the NH₃—SCR catalyst may consist of any material or combination of materials that can adsorb ammonia and facilitate the NOx+NH₃ to yield nitrogen. The NH₃—SCR catalyst should preferably be made of a base metal catalyst on a high surface area support such as alumina, silica, titania, zeolite or a combination of these. More preferably, the NH₃—SCR catalyst should be made of a base metal selected from the group consisting of Cu, Fe, and Ce and/or a combination of these metals, although other base metals may be used. Base metals generally are able to effectuate NOx conversion using ammonia while both the base metals and the high surface support material serves to store $NH_3$. The base metal and high surface area support such as zeolite selected should preferably be one that can store $NH_3$ over the widest possible temperature range. Likewise, the base metal selected is preferably one that can convert NO and $NO_2$ to $N_2$ across the widest possible temperature range and the widest range of $NO/NO_2$ ratios.

The advantage of the catalyst system of this invention is the use of a combination of a lean NOx trap and an NH₃—SCR catalyst. The use of a lean NOx trap in the present system allows for much greater storage of NOx R, because the NOx breakthrough that would otherwise happen can be controlled by the NH₃—SCR catalyst. Additionally, the use of a lean NOx trap as part of this system allows for the operation of the engine at lean conditions for a longer time and thus provides improved fuel economy. If, for example, a three-way catalyst is used as the NOx storage mechanism, NOx storage is significantly limited, as well as the production of ammonia. To maximize the reduction of emissions, a three-way catalyst must be operated at stoichiometric conditions. Accordingly, unless the three-way catalyst is run on the rich side 100% of the time, ammonia production is significantly less than for a typical lean NOx trap. As set forth above, the efficiency of a three-way catalyst is compromised if it is operated at conditions other than at stoichiometric conditions. Thus, the combination of a lean NOx trap and NH₃—SCR catalyst allows for significant NOx storage and ammonia production and thus increases net NOx conversion.

In a preferred embodiment, the lean NOx trap and NH₃—SCR catalyst constitute alternating zones in a single substrate and/or a single catalytic converter can. This zoned design, as shown in three different embodiments in FIGS. 4a-4c, is believed to maximize the reaction between ammonia and NOx.

As illustrated in FIG. 4, three zoned catalyst system embodiments were evaluated on a laboratory flow reactor. The total catalyst system dimensions were held constant at a 1" diameter and 2" length. The first system, labeled "4a", had a 1" long lean NOx trap followed by a 1" long NH₃—SCR catalyst. In the second system, labeled "4b", the catalyst samples were sliced in half to yield alternating ½" long sections. Finally, in the third system, labeled "4c", the same catalyst samples were further cut in half to yield ¼" long sections, again of the lean NOx trap and NH₃—SCR catalyst technologies. It should be noted that each time the catalysts were sliced, as shown in "4b" and "4c", the overall length of the catalyst system was reduced slightly, approximately 3/16" total. The alternating lean NOx trap and NH₃—SCR catalyst zones can be created in a single substrate or the lean NOx trap and NH₃—SCR catalyst prepared, cut as desired and then placed adjacent one another in a single can. The zones are preferably formed in a single substrate. However, cut substrates placed in alternating fashion also exhibit improved net NOx conversion.

Under the zoned catalyst designs shown in FIGS. 4a-4c, where alternating lean NOx and NH₃—SCR catalyst zones are provided, the ammonia formed by the lean NOx trap is believed to be immediately adsorbed by the NH₃—SCR catalyst for use in the NOx conversion reaction. It is further believed that the greater the separation between the lean NOx trap and the NH₃—SCR catalyst, the greater chance there is for the ammonia to be converted back into NOx. It is further believed that oxygen is more abundant in the back of a catalyst substrate and thus the oxygen may be available to effectuate the unwanted conversion of the ammonia back to nitrogen oxide. Accordingly, if the catalyst substrate is too long, there may be some undesired conversion that takes place; and thus in a preferred embodiment, the substrate is designed so that ammonia is available for immediate reaction with NOx.

Figure 5A:
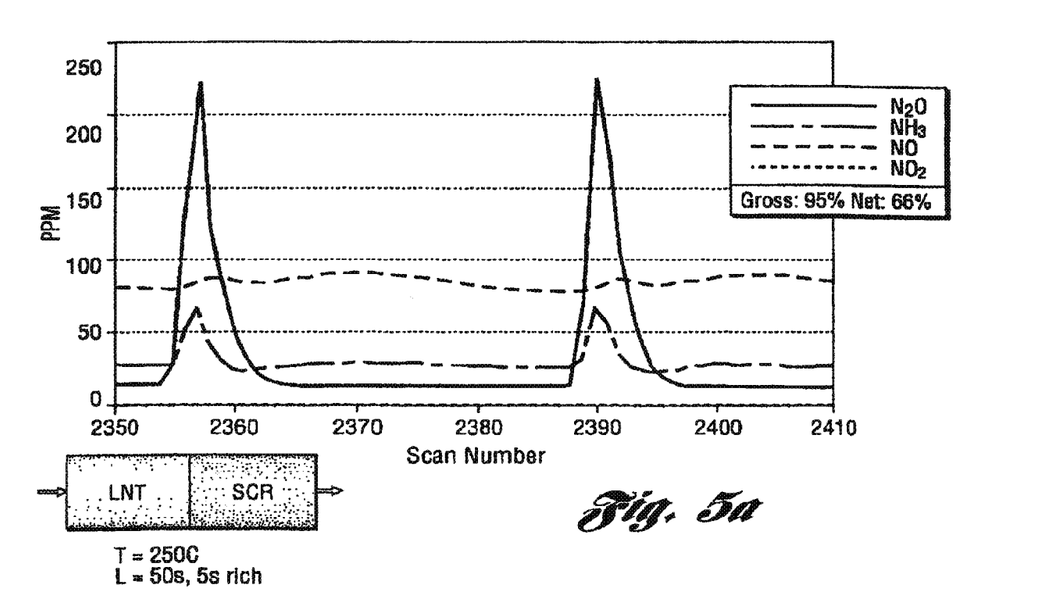
FIGS. 5a, 5b, and 5c provide graphs illustrating the reduced levels of NOx and $NH_3$ emissions resulting from each of the three zoned catalyst embodiments depicted in FIGS. 4a, 4b, and 4c at a 250° C. inlet gas temperature and operating at a 50 second lean cycle and 5 second rich cycle.
Figure 5B:
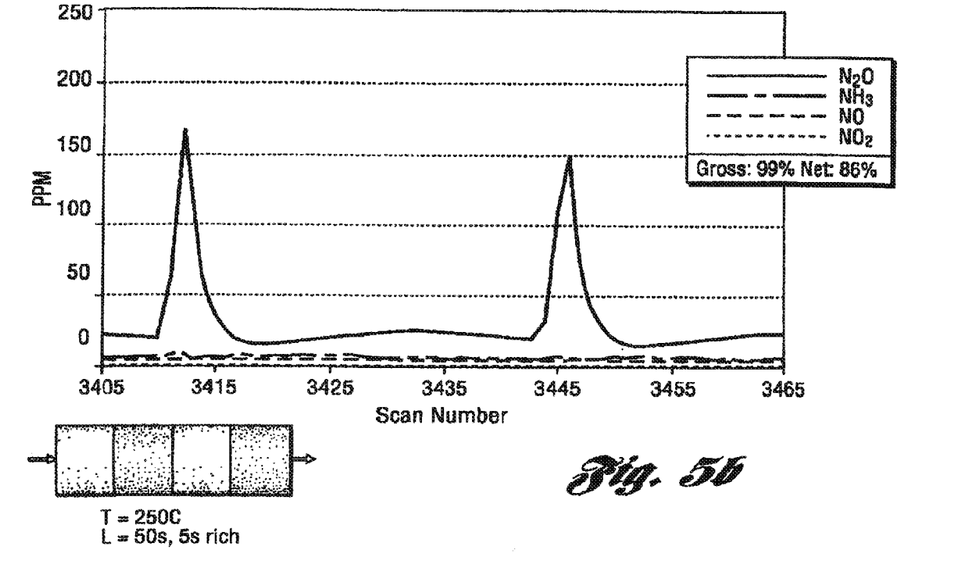
Figure 5C:
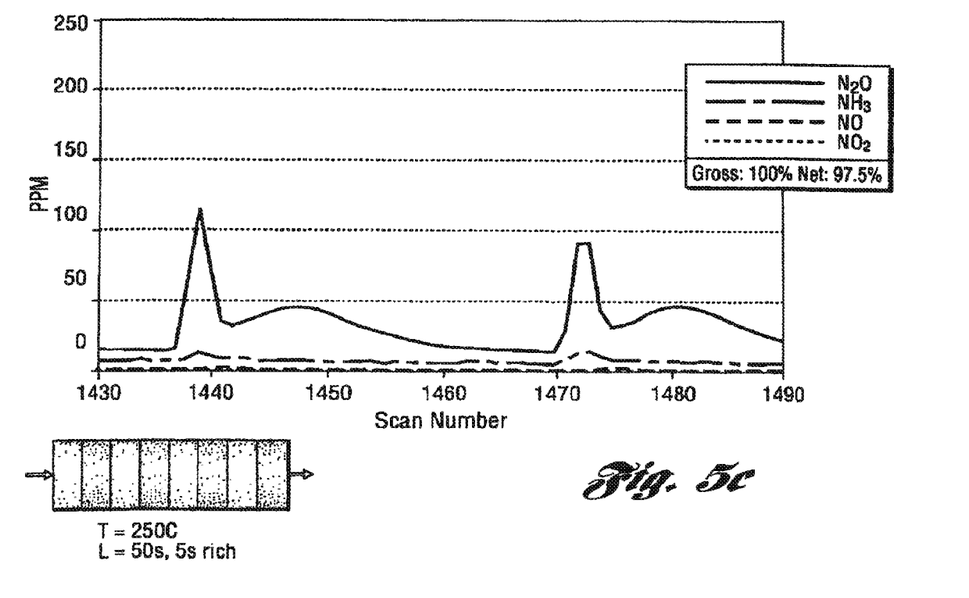

FIGS. 5a-5c illustrate laboratory reactor data of the three different zoned catalyst system embodiments shown in FIGS. 4a-4c. This laboratory data was obtained with the three catalyst systems operating at a 250° C. inlet gas temperature and operating with 50 second lean and 5 second rich cycles. Additionally, the inlet concentration of the NOx feed gas was 500 ppm and the overall space velocity was 15,000 per hour. As illustrated in FIGS. 5a-5c, with the use of a two-zoned catalyst system as depicted in FIG. 5a, approximately 50 ppm of NO is emitted. This two-zone catalyst system resulted in a gross NOx conversion of 95% and a net NOx conversion of 66%. The four-zone catalyst embodiment, depicted as FIG. 5b, significantly reduced NOx emissions, well below the 15 ppm range, to result in gross NOx conversion of 99% and a net NOx conversion of 86%. Finally, as illustrated by the eight zoned catalyst embodiment, FIG. 5c, gross NOx conversion is 100% and net NOx conversion is 97.5%. The improvement comes from the reduction of $N_2O$ elimination of the $NH_3$ breakthrough and reduction of NOx. Accordingly, as the catalyst system is zoned down from 1" sections to ¼" sections, the test results revealed an associated improvement in net NOx conversion.

As shown in FIGS. 5a-5c, a zoned catalyst, with alternating lean NOx and $NH_3$—SCR catalysts in 1" to ¼" sections significantly improves the net NOx conversion from 66% to 97.5%. In addition, the gross NOx conversion is improved from 95% to 100%. In general, the improvement in the net NOx conversion is the function of the elimination of the ammonia slip, reduction in $N_2O$, and extra NOx reduction related to the $NH_3$+NOx reaction on the $NH_3$—SCR catalyst. It is further believed that the drop in $N_2O$ emissions is likely due to a higher fraction of the NOx reduction reaction proceeding on the $NH_{13}$—SCR catalyst rather than the lean NOx trap. NOx reduction over a platinum-containing-lean NOx trap results in high levels of $N_2O$ generation, whereas the $NH_3$—SCR catalyst has a high selectivity to nitrogen.

Figure 6A:
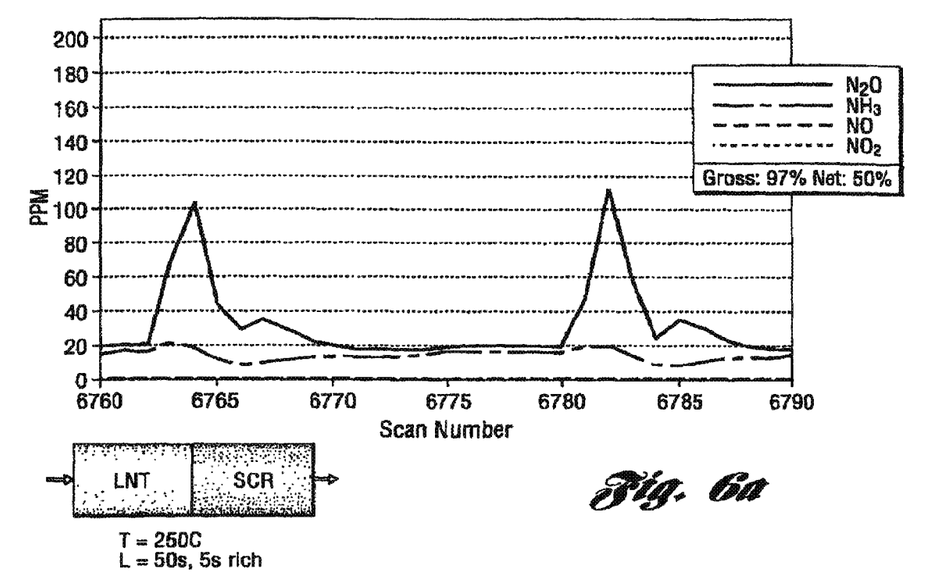
FIGS. 6a, 6b and 6c provide graphs illustrating the reduced levels of NOx and $NH_3$ emissions resulting from each of the three zoned catalyst embodiments depicted in FIGS. 4a, 4b and 4c at a 200° C. inlet gas temperature and operating at a 25 second lean cycle and a 5 second rich cycle.
Figure 6B:
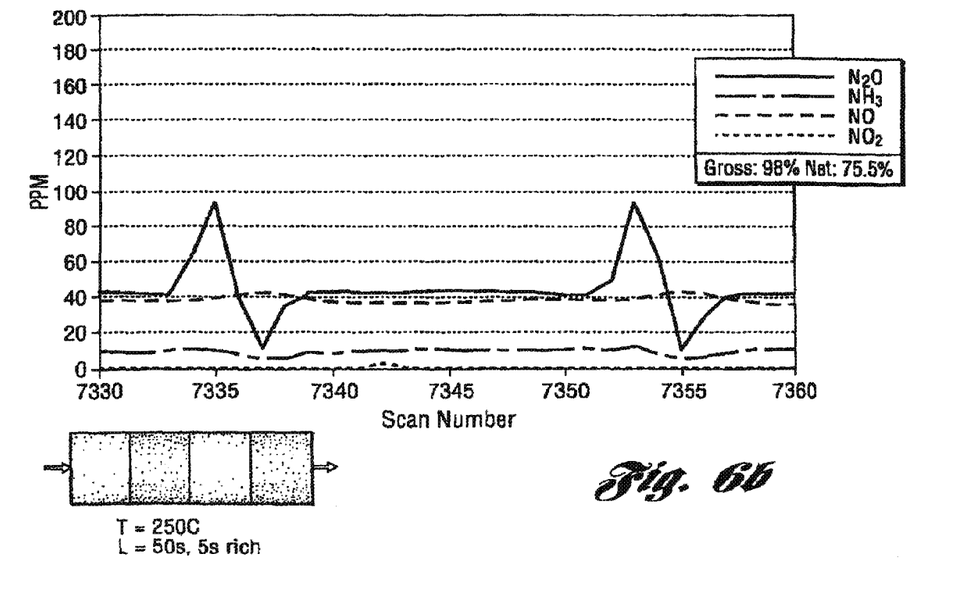
Figure 6C:
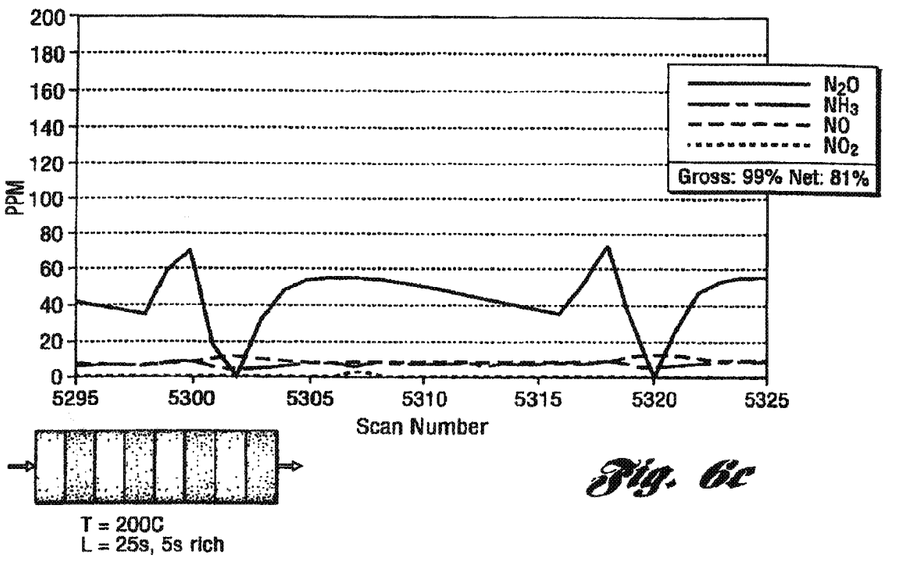

FIGS. 6a-6c depicts laboratory data obtained using the three-zoned catalyst embodiments originally shown in FIGS. 4a-4c at a 200° C. inlet gas temperature operating with a 25 second lean cycle and a 5 second rich cycle. As compared to FIGS. 5a-5c, it should be noted that shortening the lean time from 50 seconds, as used in FIGS. 5a-5c, to 25 seconds, resulted in a substantial higher steady emission of ammonia-a fact which results in reduced net NOx conversion rates, as compared to the data charted in FIGS. 5a-5c. As can be seen in FIGS. 6a-6c, the use of smaller zoned sections from two zones to eight zones and thus 1" sections down to ¼" sections, as illustrated in FIGS. 6a and 6c, improves the net NOx conversion from 50% to 81%. Again, this improvement is believed to come mainly from the reduction of ammonia breakthrough and a small reduction in $N_2O$ emissions. This lab data was obtained with an inlet concentration of the NOx feed gas at 500 ppm and an overall space velocity at 15,000 per hour.

As set forth above, in the preferred embodiment, the lean NOx trap washcoat and $NH_3$—SCR washcoat are combined in a single substrate rather than placing the $NH_3$—SCR formulation downstream of the lean NOx adsorber as two separate catalyst substrates. Under this embodiment, the catalyst formulations can be incorporated together by mixing or layering the washcoats on a substrate.

Figure 7A:
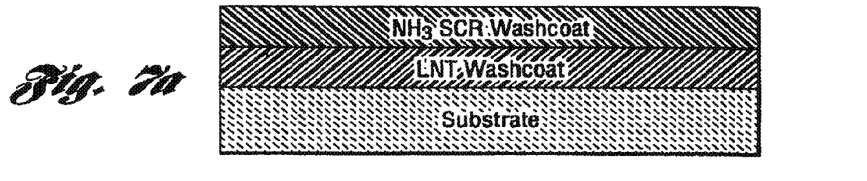
FIGS. 7a, 7b and 7c show three proposed examples of washcoat configurations incorporating the lean NOx trap and $NH_3$—SCR formulations into the same substrate.
Figure 7B:
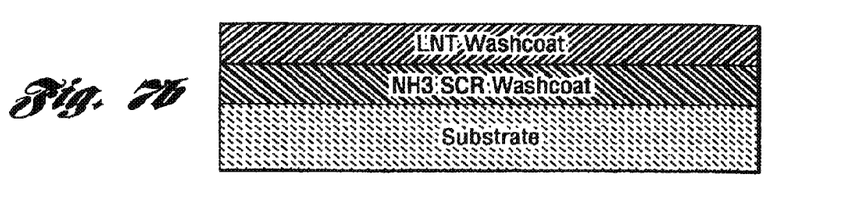
Figure 7C:
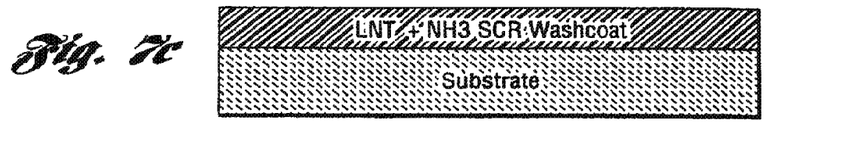

FIGS. 7a-7c show three proposed washcoat configurations incorporating the lean NOx trap and $NH_3$—SCR formulations into the same substrate. As shown in FIGS. 7a and 7b, the first and second proposed configurations have the lean NOx trap and $NH_3$—SCR washcoat formulations on the bottom and top layer, respectively. It is believed that the top layer could be a highly porous structure that allows better and faster contact between the chemicals and gas phase and the active sites in the second layer. The third configuration, as shown in FIG. 7c, involves the use of a one layer washcoat containing both lean NOx trap and $NH_3$—SCR washcoat formulations. Under this third configuration, shown in FIG. 7c, the washcoat composition of the lean NOx trap and $NH_3$—SCR catalyst could be homogeneously or heterogeneously mixed. For a heterogeneously mixed composition, the formulation of the lean NOx trap and $NH_3$—SCR catalyst are separated. However, they contact each other in varying degrees by controlling the size of the grain structures. The homogeneously mixed composition allows for a more intimate contact between the two formulations and is thus preferred.

The invention also contemplates engineering such combinations within the pores of the monolithic substrate. An example of this is incorporating washcoat into porous substrates used for filtering diesel particulate matter. Thus, this lean NOx trap/$NH_3$—SCR catalyst concept can be integrated into diesel particulate matter devices.

This very active SCR reaction of NOx and ammonia proceeds with or without oxygen present. Koebel et al. reports that the fastest SCR reaction involves equal molar amounts of NO and $NO_2$. NO and $NO_2$ then react with two $NH_3$ to yield $N_2$ in the absence of oxygen. In contrast, the lean NOx adsorber reaction of NOx plus CO is highly reactive only in an oxygen-free environment. In a lean NOx adsorber system, NOx is adsorbed during the lean cycle duration, NOx is not reduced. Accordingly, NOx reduction is limited to only the rich pulse time duration. On the other hand, the lean NOx adsorber+$NH_3$—SCR catalyst system allows for NOx reduction reaction to proceed during both the lean and rich time durations. Accordingly, ammonia as a reductant can be considered as a much more robust reductant than carbon monoxide.

Figure 8:
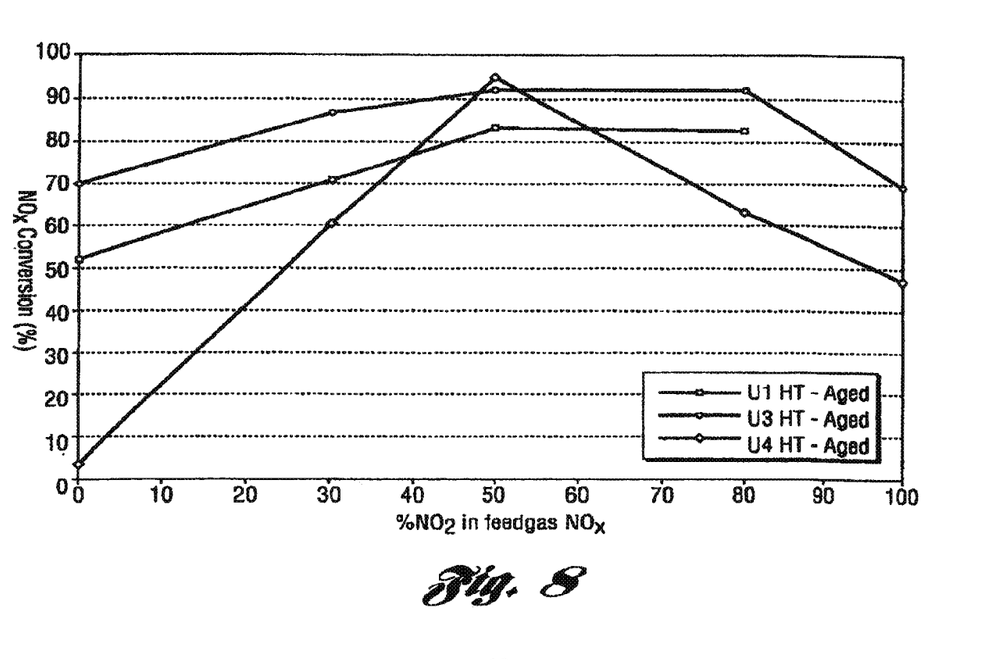
FIG. 8 is a graph illustrating the impact of NOx conversion after hydrothermal aging.

As set forth above, the fastest SCR reaction involves equal molar amounts of NO and $NO_2$. Accordingly, FIG. 8 illustrates the impact of varying $NO:NO_2$ ratios after hydrothermal aging. FIG. 8 is a graph of three $NH_3$—SCR catalyst formulations over a wide $NO:NO_2$ range. In the laboratory, it was possible to control the $NO:NO_2$ ratio entering the downstream $NH_3$—SCR catalyst. Accordingly, the $NO:NO_2$ ratio entering the $NH_3$—SCR catalyst was solely dependent on the upstream lean NOx adsorber. In some cases, the majority of the feed NOx (especially NOx spikes) are made up of mostly NO rather than $NO_2$. Accordingly, it is believed that the catalyst formulations of this invention will enhance reported net NOx efficiency—and thus the preferred catalyst is one that is capable of operating across the broadest range of $NO:NO_2$ ratios, and at a full spectrum of temperature ranges.

In general, since $NH_3$—SCR catalysts do not contain precious metals, they are significantly less costly than a typical lean NOx trap. Accordingly, it is more cost effective to have an overall catalyst system containing a lean NOx trap adsorber and an $NH_3$—SCR catalyst system, rather than one that uses two lean NOx trap adsorbers. Additionally, the incorporation of both a lean NOx trap and $NH_3$—SCR washcoat into a single substrate will significantly reduce substrate costs.

In another embodiment of this invention, $NH_3$ and NOx in an exhaust stream are reduced using a stoichiometric three-way catalyst system. This three-way catalyst system has particular application for high speed/high flow rate conditions (i.e., US06 conditions). Currently, three three-way catalysts are used for such high speed condition applications, wherein the third three-way catalyst is primarily directed to NOx removal for high speed/high flow rate conditions. Under this alternate embodiment, the third three-way catalyst can be substituted with an $NH_3$—SCR catalyst to store $NH_3$ for reaction with NOx to improve net NOx conversion, eliminate $NH_3$ emissions and reduce catalyst costs.

To improve net NOx and $NH_3$ reduction, the second three-way catalyst can be modified to enhance the three-way catalyst's ability to generate $NH_3$ emissions. To this end, in a preferred embodiment, the three-way catalyst is designed to generate desirable $NH_3$ creation by using platinum as the precious metal of the three-way catalyst, by placing platinum on the outer layer of the three-way catalyst to maximize the NO+$H_2$→$NH_3$ reaction. Likewise, the oxygen storage capacity (OSC) of the three-way catalyst can be removed to further promote the creation of "desirable" $NH_3$. By doing so, the $NH_3$ purposely generated during rich operation can then be stored by the $NH_3$—SCR catalyst for subsequent reaction with NOx emissions, and thereby control both NOx and $NH_3$ emissions under all operating conditions.

When a car is operated under rich conditions, the air/fuel ratio is less than 14.6, hydrogen is produced in the exhaust via the water-gas shift reaction: $CO+H_2O \rightarrow CO_2+H_2$. The hydrogen that is produced then reacts with NOx, as it passes over the precious metal surface to create "desirable" ammonia. The ammonia produced is then stored on an $NH_3$—SCR catalyst to help reduce net NOx conversion. The reaction of $NOx+NH_3 \rightarrow N_2+H_2O$ can then take place on a separate $NH_3$ selective catalyst, capable of converting $NO_2$ and NO to $N_2$.

Figure 9:
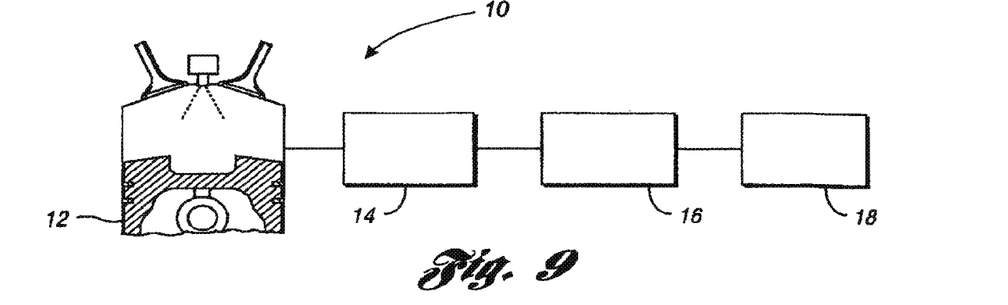
FIG. 9 depicts a modified three-way catalyst and $NH_3$—SCR catalyst system of the present invention.

As shown in FIG. 9, a stoichiometric three-way catalyst/ $NH_3$—SCR catalyst system 10 is depicted, including a first three-way catalyst 14 positioned in close proximity to the engine 12 to reduce cold start emissions. The second three-way catalyst 16 is modified as described above to enhance the ability of the second three-way catalyst 16 to generate $NH_3$ emissions. Downstream of the second three-way catalyst 16 is an $NH_{13}$—SCR catalyst 18 that functions to store $NH_3$ produced by the modified second three-way catalyst 16 for reaction with NOx emissions, to reduce both NOx and $NH_3$ emissions.

By substituting the third three-way catalyst as currently used with an $NH_3$—SCR catalyst and thereby eliminating the need for a third precious metal containing catalyst, significant cost savings can be achieved.

It should further be noted that this invention also contemplates the use of a three-way catalyst, in combination with a lean NOx trap and an $NH_3$—SCR catalyst.

While the best mode for carrying out the invention has been described in detail, those familiar with the art to which this invention relates will recognize various alternative designs and embodiments for practicing the invention as defined by the following claims.

We claim:

1. An NOx purifying catalyst for purifying NOx in exhaust gas discharged from an internal combustion engine with air-fuel ratios controlled to be lean and rich, comprising:
    a first catalytic layer that includes a zeolite having at least one element selected from the group consisting of iron and cerium elements;
    a second catalytic layer that includes a noble metal and cerium oxide-based material; wherein
    the second and the first catalytic layers are coated on a support in that order, so that the first catalytic layer is the uppermost layer,
    NOx passes through the first catalytic layer and is oxidized and adsorbed on the second catalytic layer in the lean condition,
    NOx adsorbed on the second catalytic layer is converted to $NH_3$ by the reaction with a reductant on the second catalytic layer,
    the $NH_3$ is then transferred to and adsorbed on the first catalytic layer in the rich region, and the $NH_3$ reacts with NOx to be converted to nitrogen and water.

2. The NOx purifying catalyst according to claim 1, wherein the noble metal is at least one selected from the group consisting of platinum, rhodium and palladium.

3. The NOx purifying catalyst according to claim 1, wherein the reductant is at least one selected from the group consisting of CO and HC components of the exhaust gas, and hydrogen generated from at least one of the CO and HC components contacting with the second catalytic layer.

4. The NOx purifying catalyst according to claim 1, wherein the second catalytic layer further comprises heat resisting inorganic oxide.

5. The NOx purifying catalyst according to claim 4, wherein the inorganic oxide comprises a zirconium oxide-based material.

6. The NOx purifying catalyst according to claim 5, wherein the zirconium oxide-based material is at least one oxide selected from zirconium oxide and composite oxide of zirconium and rare earth elements.

7. The NOx purifying catalyst according to claim 1, wherein the cerium oxide-based material in the second catalytic layer is at least one oxide selected from cerium oxide and composite oxide of cerium and rare earth elements.

8. The NOx purifying catalyst according to claim 1, wherein the second catalytic layer further comprises a washcoat.

9. The NOx purifying catalyst according to claim 1, wherein the second catalytic layer further comprises an inorganic oxide including at least one of alkali metals, alkali earth metals, rare earth metals, a composite of cerium and zirconium or combinations thereof.

* * * * *